United States Patent
Khris

(10) Patent No.: US 10,841,418 B2
(45) Date of Patent: Nov. 17, 2020

(54) METHOD FOR VERIFYING THE VALIDITY OF A TELEPHONE LINE OF A USER OF A SERVICE OR OF A SOFTWARE APPLICATION

(71) Applicant: ONOFF TELECOM, Paris (FR)

(72) Inventor: Taïg Khris, Paris (FR)

(73) Assignee: ONOFF TELECOM, Paris (FR)

( * ) Notice: Subject to any disclaimer, the term of this patent is extended or adjusted under 35 U.S.C. 154(b) by 118 days.

(21) Appl. No.: 16/341,403

(22) PCT Filed: Sep. 13, 2017

(86) PCT No.: PCT/EP2017/073053
§ 371 (c)(1),
(2) Date: Apr. 11, 2019

(87) PCT Pub. No.: WO2018/068978
PCT Pub. Date: Apr. 19, 2018

(65) Prior Publication Data
US 2020/0045543 A1     Feb. 6, 2020

(30) Foreign Application Priority Data
Oct. 16, 2016 (FR) .................................. 16 60004

(51) Int. Cl.
*H04W 12/06* (2009.01)
*H04M 3/38* (2006.01)
*H04W 8/18* (2009.01)

(52) U.S. Cl.
CPC ............. *H04M 3/38* (2013.01); *H04W 12/06* (2013.01); *H04M 2203/6081* (2013.01); *H04W 8/183* (2013.01)

(58) Field of Classification Search
CPC ........ H04W 12/06; H04L 63/08; H04L 63/18; H04L 9/3215
See application file for complete search history.

(56) References Cited

U.S. PATENT DOCUMENTS

2014/0115681 A1*  4/2014  Lemberg ............... H04L 63/08
726/7

FOREIGN PATENT DOCUMENTS

| CN | 104661210 A | 5/2015 |
| EP | 3043580 A1 | 7/2016 |
| KR | 20130113769 A | 10/2013 |

OTHER PUBLICATIONS

Computer-generated translation of Korean Application Publication 1020130113769, dated Oct. 16, 2013.*

(Continued)

*Primary Examiner* — Minh Dinh
(74) *Attorney, Agent, or Firm* — Klein, O'Neill & Singh, LLP

(57) ABSTRACT

Verification of the validity of a telephone line of a user likely to use a service or a software application, the verification process can include: the allocation to said validation procedure, by a validation system, of a temporary validation telephone number that has a predetermined validity duration; the generation of a call by the communication terminal of the user, via a telephone communication network, to the temporary validation telephone number; the verification of the correspondence between the temporary validation telephone number called and the validation procedure; and the validation of the telephone line of the user insofar as the correspondence between the temporary validation telephone number called by the communication terminal of the user and the validation procedure has been verified in the preceding step, such that the client system is able to authorise the user to use the service or software application.

6 Claims, 1 Drawing Sheet

(56) References Cited

OTHER PUBLICATIONS

Search Report on related FR application (FR 1660004) from the French Intellectual Property Office dated Jul. 7, 2017.
International Search Report and Written Opinion on corresponding PCT application (PCT/EP2017/073053) from International Searching Authority (EPO) dated Nov. 23, 2017.

* cited by examiner

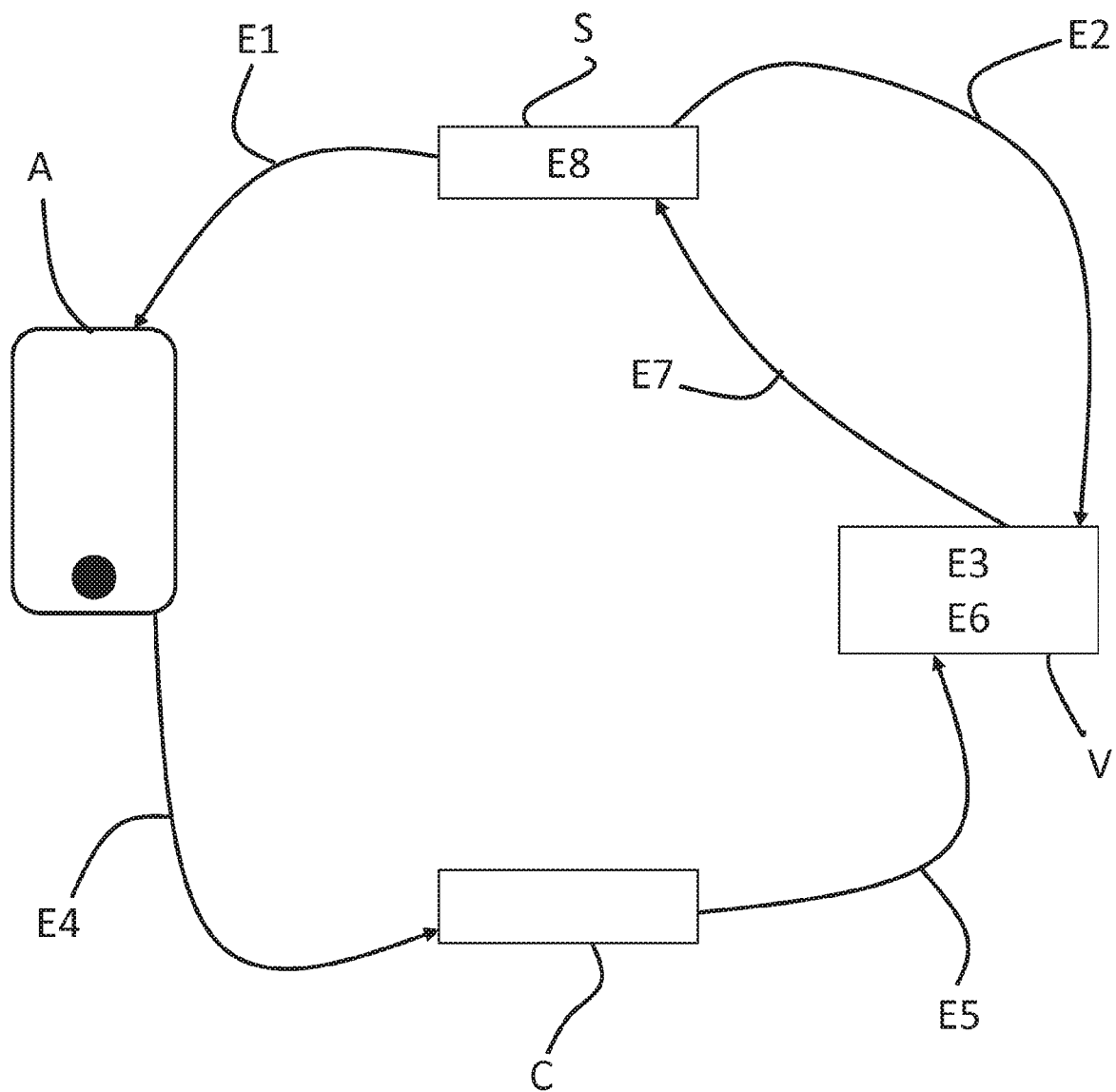

METHOD FOR VERIFYING THE VALIDITY OF A TELEPHONE LINE OF A USER OF A SERVICE OR OF A SOFTWARE APPLICATION

TECHNICAL FIELD

Broadly speaking, the invention relates to the authentication of a telephone line of a user of a service or of a software application. More specifically, the present invention relates to a method that makes it possible to identify the number of the telephone line associated with a SIM card integrated into a communication terminal of a user of a service or of a software application. The method according to the invention thus makes it possible to verify that a user who wishes to register on a server, for the purpose of using a service or of a software application, in particular implemented by a portable communication terminal, such as a smartphone, is indeed the owner of a valid telephone line, and to identify the number of said telephone line linked to a valid SIM card present in their smartphone, whether this be a hard SIM or soft SIM.

It is specified that, as is known to a person skilled in the art, a SIM card, SIM being an acronym for "Subscriber Identify Module", is a chip comprising a microcontroller and a memory and which forms a subscriber card to a mobile telephone service, said carte being integrated into a portable communication terminal, such as a smartphone.

The method according to the invention consequently makes it possible for the authentication of a user who wishes to use such a service or such a software application by means of a communication terminal portable, said communication terminal being capable of contributing to a telephone connection on a telephone communication network, for example of the GSM type (for "Global System for Mobile Communication, technology also designated under the name 2G), of the UMTS type (for "Universal Mobile Telecommunications System", technology also designated under the name 3G), of the LTE type (for "Long Term Evolution", technology also designated under the name 4G) or of the CDMA type (for "Code Division Multiple Access").

Said communication terminal is moreover capable of establishing a connection over a data communication network.

When such a user wishes to execute a service or a software application on their portable communication terminal, the publisher or the supplier of said service or of said software application wants to be able to authenticate said user, in particular by verifying the validity of the telephone line, i.e. of the SIM card, associated with said portable communication terminal.

BACKGROUND

As is known, numerous suppliers of services and publishers of software applications for smartphones authenticate the users of their services and software applications by means of the verification of the validity of their telephone lines.

For this purpose, a widespread technique consists, for the supplier of a service or the publisher of a software application, of emitting a short message of the SMS type (for "Short Message Service"), via a server, intended for a telephone line number entered by the user.

The short message is received on the portable communication terminal of the user if they have correctly entered the number of the telephone line that corresponds to the SIM card integrated into their portable communication terminal. The short message generally comprises an alphanumeric and/or numerical verification code that has a limited validity duration, said verification code having to be copied on an interface, of the web interface type, connected to the server, such that the supplier of the service or the publisher of the software application to be able to verify that the user has indeed received the short message, and therefore that the number of the telephone line that they entered is valid.

This technique is widespread and is implemented by numerous suppliers of services and publishers of software applications, in particular on a large scale.

Yet, this known technique comprises disadvantages, in particular a significant cost, linked to the cost of sending short messages, and a risk of interception of the short messages sent, making it possible for third parties to be unduly identified.

In addition, the cost that corresponds to the sending of a short message for each validation, although this is already substantial, ultimately, when the volume of users is high, can be even further multiplied when, for reasons of a congested telephone network, the short message sent is not received, or in the least is not received immediately, by the user, such that they perform the manipulation again, generally a simple click on a validation button, generating the short message, which multiplies the costs of sending said short message.

In addition, the sending of short messages is not secure, and the short messages sent by the server can be intercepted and used by third parties, independent of the user.

To overcome these disadvantages, the present invention proposes a method for verifying the validity of a telephone line associated with a communication terminal by means of which a user wishes to register in order to use a service or a software application.

The method according to the invention does not require the sending of short messages by the supplier of the service or the publisher of the software application. Moreover, it makes it possible for a secure validation of the telephone line implemented by the user.

For this purpose, the method according to the invention proposes the allocation of a temporary validation telephone number associated with a validation procedure validation procedure that involves the user and the service or the software application for which said user wishes to register, by means of a dedicated validation system that has a plurality of temporary numbers available. The association between the temporary validation telephone number and the validation procedure, said validation procedure being intrinsically linked to the user and to the service or to the software application considered, is by definition valid for a limited duration.

The method provides to cause the emission of a call by the communication terminal of the user intended for said temporary validation telephone number which was assigned to the validation procedure. This call, notified to the dedicated validation system, makes it possible to validate the caller telephone line, corresponding to that of the user to be authenticated.

SUMMARY

More specifically, the invention relates to a method for verifying the validity of a telephone line of a user likely to use a service or a software application, with the purpose of authorising said user to use a service or a software application, by means of a communication terminal of the user associated with said telephone line, the method comprising the following steps:

the initiation, by a client system associated with the service or with the software application, of a validation procedure of the user likely to use the service or the software application, said validation procedure being associated with an ID of said user and with said service or with said software application, the allocation to said validation procedure, by a validation system, of a temporary validation telephone number that has a predetermined validity duration, the generation of a call by the communication terminal of the user, via a telephone communication network, to the temporary validation telephone number, the reception of the call by a call server, the transmission of the call received by the call server to the validation system, the notification by the validation system to the client system, where applicable, of the call received intended for the temporary validation telephone number, during the predetermined validity duration of said temporary validation telephone number, the verification of the correspondence between the temporary validation telephone number called and the validation procedure, to ensure that the communication terminal of the user emitted the call intended for the temporary validation telephone number, during the predetermined validity duration of said temporary validation telephone number, and the validation of the telephone line of the user insofar as the correspondence between the temporary validation telephone number called by the communication terminal of the user and the validation procedure has been verified in the preceding step, such that the client system is capable of authorising the user to use the service or software application.

Thanks to the method according to the invention, the supplier of the service or the publisher of the software application saves money in so far as it does not have to send short messages to each one of the users wishing to be authenticated.

In addition, the security of the authentication is reinforced, given the call that makes it possible for the validation of the telephone line comes from the communication terminal of the user, actually preventing any interception of the validation codes sent via short messages.

Furthermore, the "user experience" is improved, firstly because the validation procedure is quicker and does not risk giving the impression that it is not working, as when the short message containing a verification code does not reach the user, because of a malfunction of the telephone network for example, and then because it is not compulsory for the user to manually enter the number of their telephone line.

According to an embodiment, the step of verifying the correspondence between the temporary validation telephone number called and the validation procedure is carried out by the client system.

According to another embodiment, the step of verifying the correspondence between the temporary validation telephone number called and the validation procedure is carried out by the validation system.

According to an embodiment, the validation system acquires, via the call server, a number of a telephone line at the origin of the call intended for the temporary validation telephone number, said number of a telephone line being associated with a subscriber card to a mobile telephone service integrated into the caller communication terminal, and said validation system notifies said number of a telephone line to the client system.

According to a particular embodiment, the user moreover enters their telephone line number on an interface of the client system and said client system verifies that the call intended for the temporary validation telephone number is indeed coming from said telephone line number entered by the user on the interface of the client system.

Advantageously, according to an embodiment, if no call intended for the temporary validation telephone number is received during the predetermined validity duration of said temporary validation telephone number, the validation system notifies to the client system a failure of the validation procedure, such that said client system is capable of not authorising the user to use the service or the software application.

BRIEF DESCRIPTION OF THE DRAWINGS

The invention will be better understood upon reading the following description, given solely by way of example, and in reference to the appended FIG. 1 which shows the working block diagram of the method according to the invention.

DETAILED DESCRIPTION

It is reminded that the present invention is described hereinafter using various non-limiting embodiments and is likely to be implemented in alternatives that are within the scope of a person skilled in the art, also aimed for by the present invention.

In the description below, the term "communication terminal" means any electronic device, in particular any mobile telephone of the "smartphone" type, provided with calculation means and data storage means and capable of transmitting and receiving data via a telephone communication and/or data network.

In FIG. 1, the communication terminal A is thus, in particular, a smartphone connected to a telephone communication network and to a data communication network.

It is reminded that a telephone communication network consists of a private or extended communication infrastructure that makes it possible for the connection of a plurality of communication equipment such as servers, switches, databases and communication terminals. In a known manner, the communication infrastructure of a telephone communication network forms a wireless and/or wired network. In particular, in the context of the invention, the telephone communication network is of the GSM, CDMA, UMTS or LTE type.

It is also reminded that a data communication network consists of a private or extended communication infrastructure that makes it possible for the connection of a plurality of communication equipment, such as servers, switches, databases or communication terminals for example. In a known manner, the communication infrastructure of a data communication network forms a wireless and/or wired network. In the context of the invention, the data communication network is, in particular, a network compliant with the IP protocol.

FIG. 1 shows a communication terminal A seeking to register on a web interface connected to a client system S, for the purpose of being authenticated in order be able to access, for example, services or to use a software application.

To authenticate the user, the client system S needs to verify the validity of the telephone line associated with the communication terminal A implemented by the user.

According to the invention, the method for validating the telephone line of the user unfolds according to the following sequence.

When a client system S initiates a validation procedure of the telephone line of a client—user applying for the use of a service or of a software application via their communication terminal A, the user, via their communication terminal A (step E1), and a validation system V (step E2) are informed of this.

The validation system V has a database comprising a plurality of available telephone line numbers. The validation system V assigns a temporary validation telephone number to the validation procedure initiated by the client system S (step E3), to make it possible for the authentication of the user for the purpose of the use of the service or of the software application considered.

The temporary validation telephone number is allocated for a predefined duration, for the specific purpose of validating the telephone line of the user, for the service or the application considered. Said predefined duration is typically of around 15 seconds.

Then, the temporary validation telephone number to be reached is notified to the communication terminal A of the user, typically via a notification emitted by the client system S, and said communication terminal A emits a call, via a telephone communication network, to this temporary validation telephone number (step E4). According to an embodiment, said call is emitted in the background, while the user remains connected on a page of the web interface of the client system for example, typically displaying a message inviting them to wait during the validation procedure. Alternatively, the call to the temporary validation telephone number is carried out as a main task, in the forefront, on the communication terminal A of the user.

The call emitted to the temporary validation telephone number by the communication terminal A of the user transits, such as is known, by a call server C which notifies the call to the addressee thereof (step E5), namely the validation system V.

If it is notified of an incoming call intended for the temporary validation telephone number (step E6), during the predetermined validity duration of said temporary validation telephone number, starting from the instant when it allocated it, the validation system V notifies to the client system S (step E7) that it has received such a call on the temporary validation telephone number that it allocated to the validation procedure.

According to the invention, the proper correspondence of the temporary validation telephone number called with the validation procedure in question, i.e. with the user and the target service or the software application, is verified.

In practice, the validation system V is capable of verifying the proper correspondence between the temporary validation telephone number called and the validation procedure considered, initiated by the client system S.

According to a main embodiment, the client system S validates, using this information relating to the proper correspondence between the temporary validation telephone number called and the validation procedure considered, the telephone line of the user and consequently authorises them to use the service or the software application.

According to a preferred embodiment, the validation system V acquires, via the call server C, the number of the telephone line calling the temporary validation telephone number, said number of a telephone line being associated with the SIM card integrated into the communication terminal A, and said validation system V notifies this telephone line number of the caller to the client system S (in step E7).

In this case, according to a particular embodiment, the user is furthermore asked beforehand to enter the number of their telephone line, making it possible for the client system S to consolidate the validation of the telephone line of said user by comparing the telephone line number supplied by the user and the telephone line number of the caller supplied by the validation system.

It must be noted, that the call intended for the temporary validation telephone number is emitted, by the communication terminal A, via a telephone communication network, while said communication terminal A can be connected to the client system S via a data communication network.

The invention claimed is:

1. A method for verifying the validity of a telephone line of a user likely to use a service or a software application, with the purpose of authorising said user to use a service or a software application, by means of a communication terminal of the user associated with said telephone line, the method comprising the following steps:

the initiation, by a client system associated with the service or with the software application, of a validation procedure of the user likely to use the service or the software application, said validation procedure being associated with an ID of said user and with said service or with said software application, the allocation to said validation procedure, by a validation system, of a temporary validation telephone number that has a predetermined validity duration, the generation of a call by the communication terminal of the user, via a telephone communication network, to the temporary validation telephone number, the reception of the call by a call server, the transmission of the call received by the call server to the validation system, the notification by the validation system to the client system, where applicable, of the call received intended for the temporary validation telephone number, during the predetermined validity duration of said temporary validation telephone number, the verification of the correspondence between the temporary validation telephone number called and the validation procedure, to ensure that the communication terminal of the user emitted the call intended for the temporary validation telephone number, during the predetermined validity duration of said temporary validation telephone number, and the validation of the telephone line of the user insofar as the correspondence between the temporary validation telephone number called by the communication terminal of the user and the validation procedure has been verified in the preceding step, such that the client system is able to authorise the user to use the service or the software application.

2. The method according to claim 1, wherein the step of verifying the correspondence between the temporary validation telephone number called and the validation procedure is carried out by the client system.

3. The method according to claim 1, wherein the step of verifying the correspondence between the temporary validation telephone number called and the validation procedure is carried out by the validation system.

4. The method according to claim 1, wherein the validation system acquires, via the call server, a number of a telephone line at the origin of the call intended for the temporary validation telephone number, said number of a telephone line being associated with a subscriber card to a mobile telephone service integrated into the caller communication terminal, and said validation system notifies said number of a telephone line to the client system.

5. The method according to claim 4, wherein the user enters their telephone line number on an interface of the client system and said client system verifies that the call intended for the temporary validation telephone number is indeed coming from said telephone line number entered by the user on the interface of the client system.

6. The method according to claim 1, wherein, if no call intended for the temporary validation telephone number is received during the predetermined validity duration of said temporary validation telephone number, the validation system notifies to the client system a failure of the validation procedure, such that said client system is capable of not authorising the user to use the service or the software application.

* * * * *